US012377665B2

(12) United States Patent
Fujisawa et al.

(10) Patent No.: US 12,377,665 B2
(45) Date of Patent: Aug. 5, 2025

(54) PRINTING DEVICE

(71) Applicant: SEIKO EPSON CORPORATION, Tokyo (JP)

(72) Inventors: Kazutoshi Fujisawa, Okaya (JP); Satoru Katagami, Matsumoto (JP); Yuichi Washio, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 18/358,726

(22) Filed: Jul. 25, 2023

(65) Prior Publication Data

US 2024/0034075 A1 Feb. 1, 2024

(30) Foreign Application Priority Data

Jul. 27, 2022 (JP) ................................ 2022-119637

(51) Int. Cl.
*B41J 11/00* (2006.01)
*B41J 2/01* (2006.01)

(52) U.S. Cl.
CPC ............ *B41J 11/00222* (2021.01); *B41J 2/01* (2013.01); *B41J 11/0024* (2021.01); *B41J 11/00242* (2021.01)

(58) Field of Classification Search
CPC ... B41J 2/01; B41J 11/00; B41J 11/002; B41J 11/0022; B41J 11/00222; B41J 11/04; B41J 11/00216; B41J 11/0242; B41J 11/0024; B41J 11/42; B41J 29/38; B41J 15/04; B41J 29/377; B65H 23/185; G03G 15/20; F26B 13/10
See application file for complete search history.

(56) References Cited

U.S. PATENT DOCUMENTS 5,634,402 A * 6/1997 Rudd ................ B41J 11/00214 34/267
11,260,682 B2 3/2022 Katagami
2003/0161552 A1* 8/2003 Shima .................... B41J 11/002 382/312
2012/0206527 A1* 8/2012 Leighton ............ B41J 11/00216 392/407

(Continued)

FOREIGN PATENT DOCUMENTS

JP 2009-279877 A 12/2009
JP 2020-192697 A 12/2020

(Continued)

*Primary Examiner* — John Zimmermann
(74) *Attorney, Agent, or Firm* — WORKMAN NYDEGGER

(57) ABSTRACT

A printing device 1 includes a setting section 2 that sets a roll-shaped print medium P, a winding section 5 that winds up the print medium P, a print head 3 that forms an image by ejecting ink onto an image forming surface P1 of the print medium P, and a drying oven 10 that is disposed downstream of the print head 3 in the transport direction and that is for drying ink that was ejected onto the print medium P, wherein the drying oven 10 includes a heating section 11 for heating the print medium P and the heating section 11 is configured such that the heating temperature at the inlet side of the drying oven 10 in the transport direction A is higher than the heating temperature at the outlet side of the drying oven 10 in the transport direction.

13 Claims, 12 Drawing Sheets

(56) References Cited

U.S. PATENT DOCUMENTS

| | | | | |
|---|---|---|---|---|
| 2014/0204157 | A1* | 7/2014 | LeFevre | B41J 13/076 347/101 |
| 2018/0229512 | A1* | 8/2018 | Katagami | B41J 15/04 |
| 2022/0371340 | A1* | 11/2022 | Kaburagi | B41J 11/00242 |
| 2023/0050269 | A1* | 2/2023 | Uda | B41J 11/00242 |

FOREIGN PATENT DOCUMENTS

| | | | | |
|---|---|---|---|---|
| WO | WO-2016084247 A1 * | 6/2016 | | A61F 13/15 |
| WO | WO-2019131843 A1 * | 7/2019 | | |

* cited by examiner

PRINTING DEVICE

The present application is based on, and claims priority from JP Application Serial Number 2022-119637, filed Jul. 27, 2022, the present disclosure of which is hereby incorporated by reference herein in its entirety.

BACKGROUND

1. Technical Field

The present disclosure relates to a printing device.

2. Related Art

In the related art, various printing devices that perform printing by ejecting ink onto a print medium are used. Among these, there is a printing device which is provided with a heating section that heats a print medium and that is capable of drying ink which was ejected onto the print medium. For example, JP-A-2020-192697 describes an intermittent transport type printing device in which an image printed by ejecting ink from a head onto roll paper is dried in a drying chamber disposed downstream of the head in the transport direction of the roll paper.

In the printing device of JP-A-2020-192697, a metallic belt contacts the rear surface of the print medium in a drying chamber to heat and dry the print medium from the rear surface. In the case of such a configuration, since the print medium is not heated before entering the drying chamber and is gradually heated inside the drying chamber, the temperature of the print medium is low in the vicinity of the inlet of the drying chamber and is high in the vicinity of the outlet of the drying chamber. This is because, in a case where the print medium repeatedly moves and stops in the intermittent transport, the print medium which enters from the inlet is heated while moving in the drying chamber until the movement stops, and thus the print medium which is positioned in the vicinity of the inlet at the time of stopping is in a state where the temperature is not sufficiently increased since the heating time is short. When heating unevenness occurs in the print medium in this way, there is a concern that drying of a portion stopped in the vicinity of the inlet will be insufficient, and there is a concern that a portion stopped in the vicinity of the outlet will be exposed to a high temperature for a long time so that wrinkling, discoloration, or the like may occur. In addition, even in a configuration in which the print medium is continuously transported instead of the intermittent transport method, there may be a portion exposed to a high temperature for a long time at the end of printing of one image or the like, and there is a concern that wrinkles, discoloration, or the like may occur in the portion.

SUMMARY

A printing device according the present disclosure for solving the above-described problem, includes a setting section for setting a roll-shaped print medium; a winding section that winds up the print medium transported from the setting section; a print head configured to form an image by ejecting ink onto an image forming surface of the transported print medium; and a drying oven that is disposed in a transport path of the print medium at a position downstream of the print head in a transport direction of the print medium and that is configured to dry ink ejected onto the print medium, wherein the drying oven includes a heating section configured to heat the print medium and the heating section is configured such that a heating temperature on an inlet side of the drying oven in the transport direction is higher than a heating temperature on an outlet side of the drying oven in the transport direction.

DESCRIPTION OF EMBODIMENTS

Figure 1:
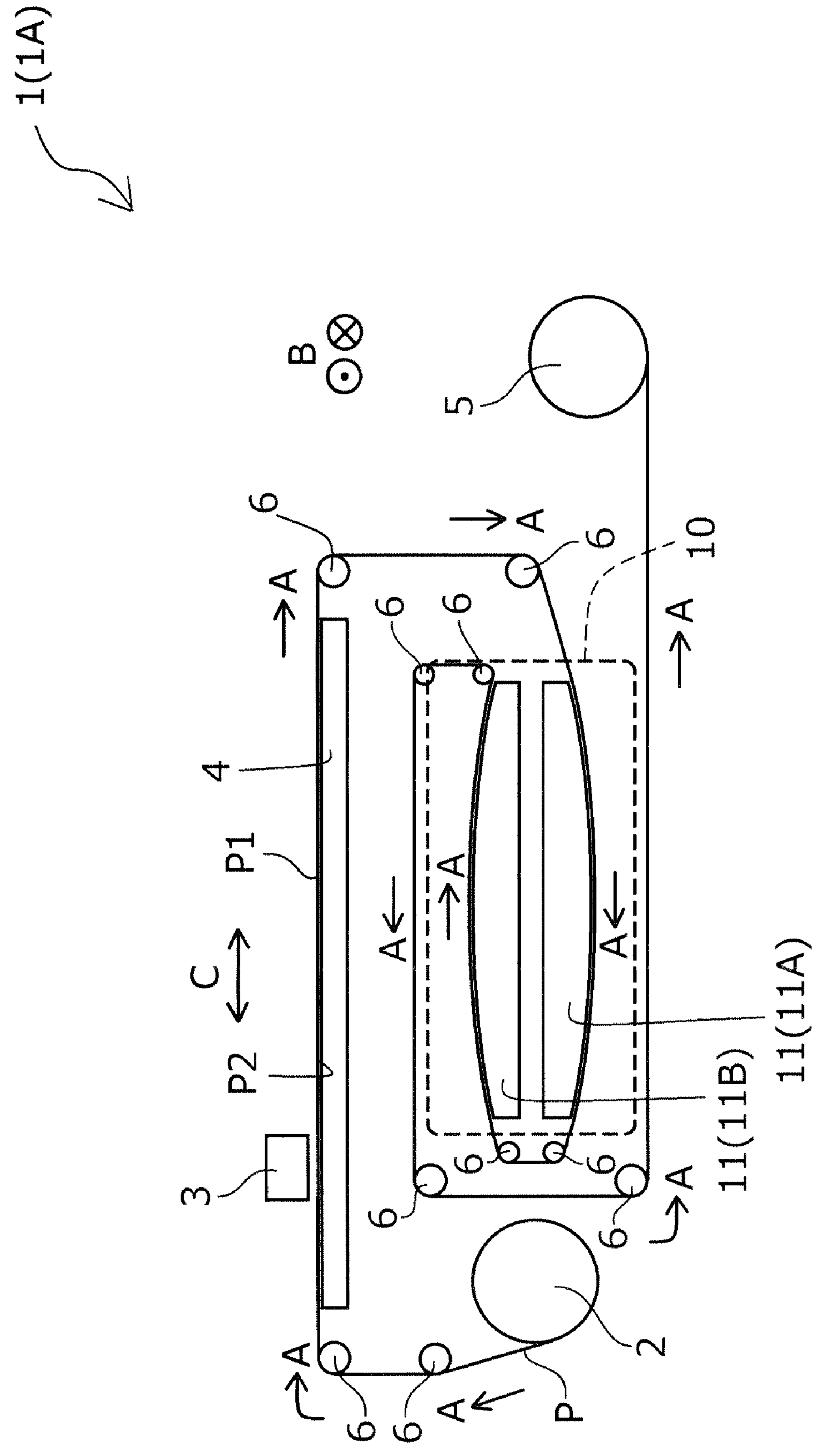
FIG. 1 is a schematic side view of a printing device according to a first embodiment of the present disclosure.

First, the present disclosure will be schematically described.

A printing device according to a first aspect of the present disclosure is for solving the above-described problem and includes a setting section for setting a roll-shaped print medium; a winding section that winds up the print medium transported from the setting section; a print head configured to form an image by ejecting ink onto an image forming surface of the transported print medium; and a drying oven that is disposed in a transport path of the print medium at a position downstream of the print head in a transport direction of the print medium and that is configured to dry ink ejected onto the print medium, wherein the drying oven includes a heating section configured to heat the print medium and the heating section is configured such that a heating temperature on an inlet side of the drying oven in the transport direction is higher than a heating temperature on an outlet side of the drying oven in the transport direction.

According to this aspect, the heating section is configured such that the heating temperature on the inlet side of the drying oven in the transport direction is higher than the heating temperature on the outlet side of the drying oven in the transport direction. Therefore, it is possible to suppress insufficient heating of the print medium in the vicinity of the inlet and excessive heating of the print medium in the vicinity of the outlet. That is, it is possible to suppress heating unevenness of the print medium.

A printing device according to a second aspect of the present disclosure is according to the first aspect, wherein the drying oven includes a heating member that contacts an opposite surface, which is opposite to the image forming surface, and heats the opposite surface, the heating section includes, as the heating member, a first heating member and a second heating member, which is disposed downstream of the first heating member in the transport direction, and a heat amount generated per unit area of the second heating member is smaller than a heat amount generated per unit area of the first heating member.

According to this aspect, the heat amount generated per unit area of the second heating member, which is disposed downstream in the transport direction, is smaller than the heat amount generated per unit area of the first heating member, which is disposed upstream in the transport direction. Therefore, it is possible to easily suppress heating unevenness of the print medium by using the heating members having different heat amounts per unit area.

A printing device according to a third aspect of the present disclosure is according to the second aspect, wherein the heating section includes a third heating member disposed downstream of the second heating member in the transport direction and a heat amount generated per unit area of the third heating member is smaller than a heat amount generated per unit area of the second heating member.

According to this aspect, the heating section further includes a third heating member, and the heat amount generated per unit area of the third heating member is smaller than the heat amount generated per unit area of the second heating member. Therefore, it is possible to suppress heating unevenness of the print medium with higher accuracy.

A printing device according to a fourth aspect of the present disclosure is according to the third aspect, wherein the printing device includes an electric power supplying section configured to supply electric power to the first heating member, to the second heating member, and to the third heating member, wherein a total heat amount of the first heating member, a total heat amount of the second heating member, and a total heat amount of the third heating member are equal and the electric power supplying section supplies electric power to the first heating member, to the second heating member, and to the third heating member by a three phase delta connection.

According to this aspect, the total heat amount of the first heating member, the total heat amount of the second heating member, and the total heat amount of the third heating member are equal to each other, and the electric power supplying section supplies electric power to the first heating member, the second heating member, and the third heating member by the three phase delta connection. With such a configuration, it is possible to easily and appropriately supply electric power to the first heating member, to the second heating member, and to the third heating member.

A printing device according to a fifth aspect of the present disclosure is according to any one of the second aspect to the fourth aspect, wherein, assuming that the drying oven is a first drying oven and that the heating section is a first heating section, a second drying oven including a second heating section configured to heat the print medium is provided downstream of the first drying oven in the transport direction and the second heating section is configured such that a heating temperature on an inlet side of the second drying oven in the transport direction is higher than a heating temperature on an outlet side of the second drying oven in the transport direction.

According to this aspect, the second drying oven having the second heating section is provided in addition to the first drying oven having the first heating section, and the heating temperature of the second heating section at the inlet side of the second drying oven is higher than the heating temperature at the outlet side of the second drying oven. Therefore, it is possible to effectively dry the ink that was ejected onto the print medium by drying the print medium in the second drying oven in addition to in the first drying oven, and it is possible to suppress heating unevenness of the print medium even in the second heating section by the heating temperature at the inlet side of the second drying oven in the transport direction being higher than the heating temperature at the outlet side of the second drying oven in the transport direction.

A printing device according to a sixth aspect of the present disclosure is according to the fifth aspect, wherein the second drying oven includes the heating member, the second heating section includes, as the heating member, a fourth heating member and a fifth heating member, which is disposed downstream of the fourth heating member in the transport direction, and a heat amount generated per unit area of the fifth heating member is smaller than a heat amount generated per unit area of the fourth heating member.

According to this aspect, the second heating section includes the fourth heating member disposed upstream in the transport direction and the fifth heating member disposed downstream in the transport direction, and the heat amount generated per unit area of the fifth heating member is smaller than the heat amount generated per unit area of the fourth heating member. Therefore, it is possible to suppress insufficient heating of the print medium in the vicinity of the inlet and excessive heating of the print medium in the vicinity of the outlet and it is possible to suppress heating unevenness of the print medium.

A printing device according to a seventh aspect of the present disclosure is according to the sixth aspect, wherein a heat amount generated per unit area of the fourth heating member is smaller than a heat amount generated per unit area of the first heating member.

According to this aspect, the heat amount generated per unit area of the fourth heating member is smaller than the heat amount generated per unit area of the first heating member. With such a configuration, it is possible to suppress excessive heating of the print medium.

A printing device according to an eighth aspect of the present disclosure is according to any one of the second aspect to the fourth aspect, wherein assuming that the heating section is a first heating section, a second heating section configured such that a heating temperature at an inlet side of the drying oven in the transport direction is higher than a heating temperature at an outlet side of the drying oven in the transport direction is provided at a position in the drying oven downstream in the transport direction from the first heating section, the second heating section includes, as the heating member, a fourth heating member and a fifth heating member, which is disposed downstream of the fourth heating member in the transport direction, and a heat amount generated per unit area of the fifth heating member is smaller than a heat amount generated per unit area of the fourth heating member.

According to this aspect, in addition to the first heating section, one drying oven includes, on the downstream side of the first heating section in the transport direction, the second heating section including the fourth heating member and the fifth heating member, which is disposed downstream of the fourth heating member in the transport direction. Therefore, it is possible to effectively dry the ink ejected onto the print medium. In addition, since the heat amount generated per unit area of the fifth heating member is smaller than the heat amount generated per unit area of the fourth heating member, it is possible to suppress heating unevenness of the print medium.

A printing device according to a ninth aspect of the present disclosure is according to the eighth aspect, wherein a heat amount generated per unit area of the fourth heating member is smaller than a heat amount generated per unit area of the second heating member.

According to this aspect, the heat amount generated per unit area of the fourth heating member is smaller than the heat amount generated per unit area of the second heating member. With such a configuration, it is possible to effectively suppress heating unevenness of the print medium while effectively drying the ink ejected onto the print medium.

A printing device according to a tenth aspect of the present disclosure is according to the first aspect, wherein the drying oven includes, as the heating section, an blower section that blows heated gas to the image forming surface, the blower section includes a first blower section and a second blower section, which is disposed downstream of the first blower section in the transport direction, and a temperature of gas blown by the second blower section is lower than a temperature of gas blown by the first blower section.

According to this aspect, the drying oven includes, as the heating section, the blower section which blows heated gas to the image forming surface. In addition, the blower section includes a first blower section and a second blower section, which is disposed downstream of the first blower section in the transport direction, and the temperature of gas blown by the second blower section is lower than the temperature of gas blown by the first blower section. For this reason, using the blower section makes it possible to suppress heating unevenness of the print medium while drying ink that was ejected onto the print medium.

A printing device according to an eleventh aspect of the present disclosure is according to any one of the first aspect, the second aspect, and the tenth aspect, wherein the heating section is configured to enable drive divided in a width direction, which intersects the transport direction.

In a configuration in which can be used a print medium that is narrow and a print medium that is wide in the width direction, which intersects the transport direction, there is a concern that electric power will be wasted if the heating section is driven in the entire width direction in the transport path of the print medium when using a print medium which is narrow in the width direction. However, according to this aspect, the heating section is configured to enable drive divided in the width direction, which intersects the transport direction. For this reason, since it is possible to limit the heating member used when the print medium that is narrow in the width direction is used, it is possible to suppress waste of electric power.

A printing device according to a twelfth aspect of the present disclosure is according to the eleventh aspect, wherein the heating section is configured to enable drive divided in the width direction in a region on an inlet side of the drying oven in the transport direction, and is not configured to enable drive divided in the width direction in a region on an outlet side of the drying oven in the transport direction.

For example, when a print medium having a narrow width is used, it is possible to effectively suppress heating unevenness of the print medium while efficiently drying the ink that was ejected onto the print medium and also while suppressing electric power by controlling with high accuracy the heating section, particularly in the region at the inlet side of the drying oven. According to this aspect, since the heating section is configured to enable drive divided in the width direction in the region at the inlet side of the drying oven in the transport direction, for example, even when the print medium having a narrow width is used, it is possible to effectively suppress heating unevenness of the print medium while efficiently drying the ink ejected onto the print medium while suppressing electric power. In addition, since the region at the outlet side of the drying oven in the transport direction is not configured to enable drive divided in the width direction, it is possible to simplify the apparatus configuration and the driving control of the heating section.

A printing device according to a thirteenth aspect of the present disclosure is according to any one of the first aspect, the second aspect, and the tenth aspect, wherein the print head is configured to eject ink onto the image forming surface while moving with respect to the print medium in a stopped state and a printing operation is executed by repeating transport of the print medium and ejection of ink from the print head after the print medium is stopped.

According to this aspect, the print head is configured to eject ink onto the image forming surface while moving with respect to the print medium in a stopped state. Then, a printing operation is performed by repeating transport of the print medium and ejection of the ink from the print head after the print medium is stopped. In the printing device having such a configuration in which the printing operation is performed while the print medium is intermittently transported, heating unevenness of the print medium is particularly likely to occur, but even in the printing device having such a configuration, heating unevenness of the print medium can be suppressed.

Hereinafter, embodiments according to the present disclosure will be described in detail with reference to the drawings.

First Embodiment

First, an overview of a printing device 1A according to a first embodiment as an example of a printing device 1 of the present disclosure will be described with reference to FIG. 1. As illustrated in FIG. 1, the printing device 1A of the present embodiment includes a setting section 2 that sets a roll-shaped print medium P, a winding section 5 that winds up the print medium P transported from the setting section 2, and a print head 3 that forms an image by ejecting ink onto an image forming surface P1 of the print medium P that is transported in a transport direction A in a transport path from the setting section 2 to the winding section 5. In addition, the printer 1 includes a platen 4, which supports the print medium P at an image forming region where an image is formed by the print head 3, and transport rollers 6, as a transport section of the print medium P, which are provided in the transport path of the print medium P.

The print head 3 is provided on a side facing the image forming surface P1 of the print medium P transported in the transport direction A, and forms an image by ejecting ink onto the image forming surface P1 that is in a state of the opposite surface P2, which is on the opposite side of the print medium P from the image forming surface P1, being supported by the platen 4. In detail, the printing device 1A of the present embodiment performs printing by reciprocating the print head 3 in a scanning direction C along the transport direction A. More specifically, the printing device 1A according to the present embodiment intermittently drives (intermittently transports) the print medium P in the transport direction A, reciprocates the print head 3 in the scanning direction C, and ejects ink from the print head 3 to perform printing.

The print head 3 of the present embodiment can complete image formation of the entire image forming region of the image forming surface P1 supported by the platen 4 in a single scanning (a single pass), and can also complete the image formation by scanning the entire image forming region a plurality of times (a plurality of passes). As a matter of course, in a case where the image formation is completed in a plurality of passes, the transport stop time of the print medium P according to intermittent transport is longer than in a case where the image formation is completed in a single pass.

As described above, the print head 3 of the present embodiment is configured to perform printing by reciprocating in the scanning direction C along the transport direction A. However, the configuration of the print head 3 is not particularly limited. Instead of the print head 3 that performs printing by reciprocal movement in the scanning direction C along the transport direction A, a print head 3 may be provided that performs printing by reciprocal movement in a width direction B, which intersects the transport direction A, or a so-called line head may be provided, the line head being provided with nozzles arranged in the width direction B for ejecting ink across the entire print medium P in the width direction B and that performs printing in a state in which the print head is stopped.

As shown in FIG. 1, a drying oven 10 for drying ink that was ejected onto the print medium P is provided in the transport path of the print medium P, further downstream in the transport direction A than the print head 3. Hereinafter, the drying oven of the printing device 1A according to the present embodiment will be described in detail with reference to FIGS. 2 and 3.

Figure 2:
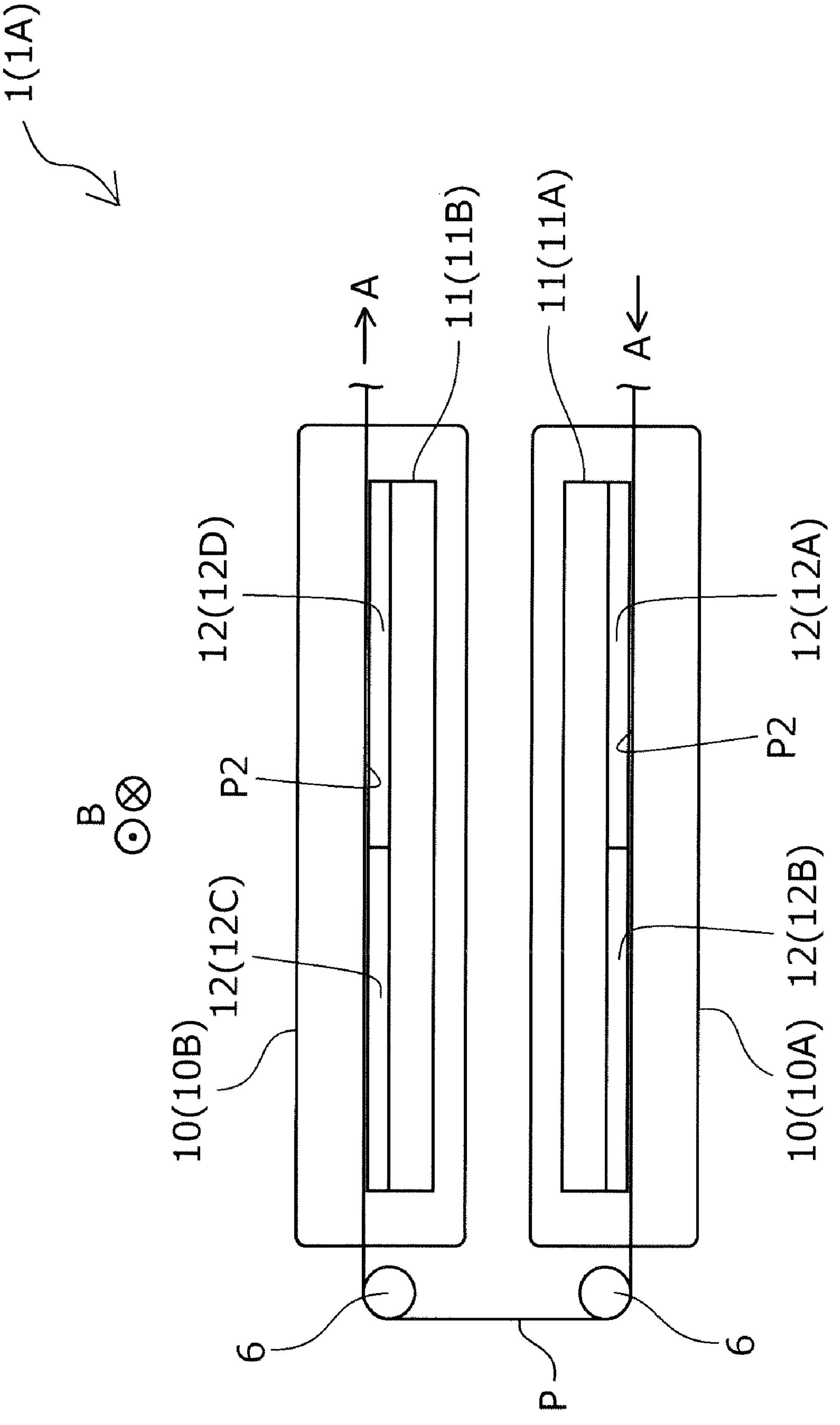
FIG. 2 is a schematic side view of a drying oven of the printing device of FIG. 1.

As shown in FIG. 2, the printing device 1A of the present embodiment includes, as the drying oven 10, a first drying oven and a second drying oven 10B. The first drying oven 10A is provided with a first heating section 11A as a heating section 11 for heating the print medium P, and the second drying oven 10B is provided with a second heating section 11B as a heating section 11 for heating the print medium P. The first heating section 11A and the second heating section 11B each include a heating member 12 that contacts the opposite surface P2 of the print medium P, which is on the side opposite from the image forming surface P1, to heat the opposite surface P2. As the heating member 12, for example, a metal plate on which nichrome wiring or the like is arranged can be used. The first heating section 11A includes, as the heating member 12, a heating member 12A and a heating member 12B, which is disposed downstream from the heating member 12A in the transport direction A. The second heating section 11B includes, as the heating member 12, a heating member 12C and a heating member 12D, which is disposed downstream from the heating member 12C in the transport direction A.

Figure 3:
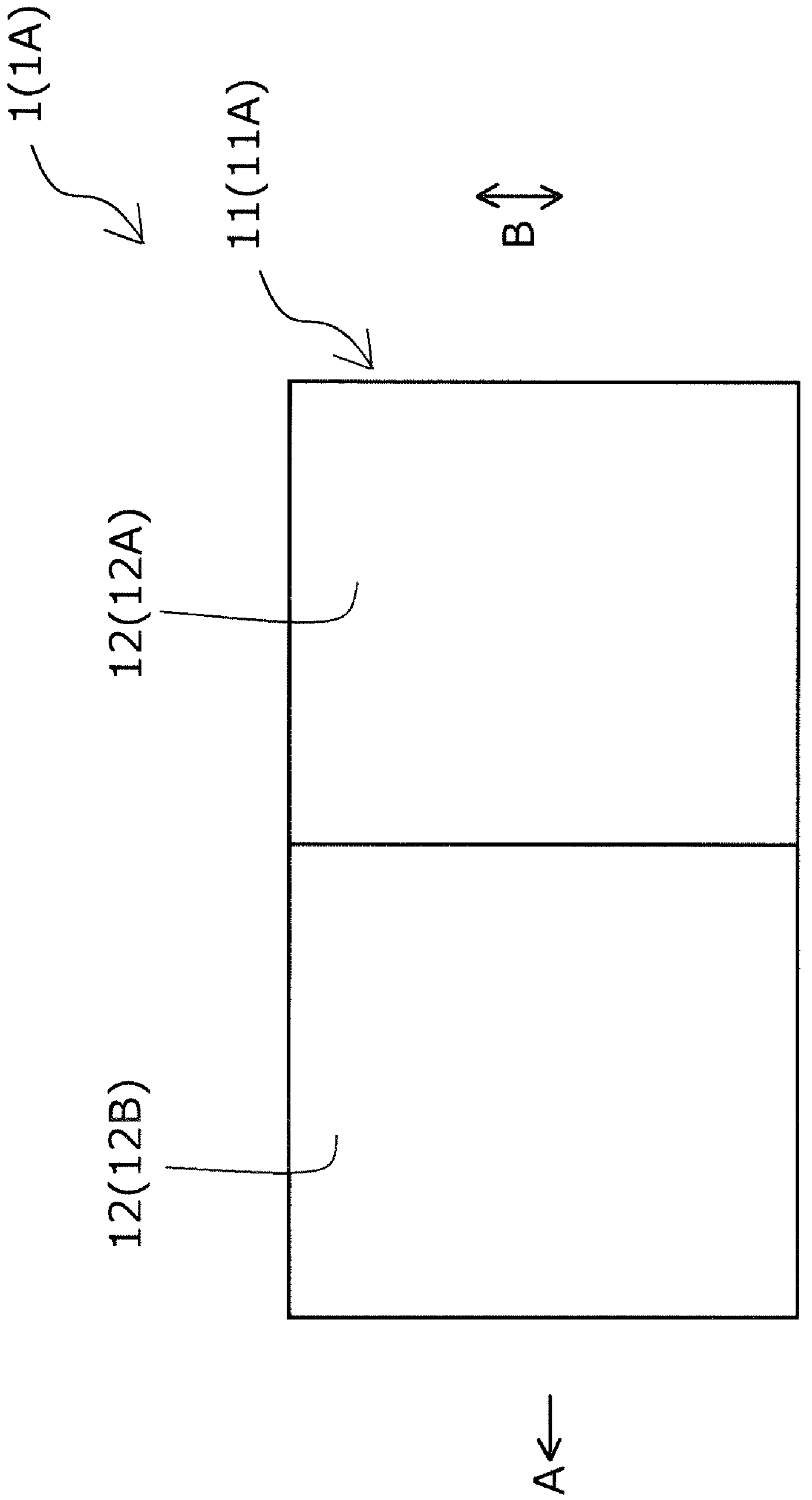
FIG. 3 is a schematic bottom view of a heating section of the printing device of FIG. 1.

Here, the first drying oven 10A and the second drying oven 10B have the same configuration except that the arrangement is reversed by 180° when viewed from the side direction as shown in FIG. 2. That is, the heating member 12A and the heating member 12C, which are at the inlet side of the drying oven 10, have the same configuration, and the heating member 12B and the heating member 12D, which are at the outlet side of the drying oven 10, have the same configuration. For this reason, although FIG. 3 is a diagram of the first heating section 11A and illustrates the heating member 12A and the heating member 12B, the second heating section 11B can be considered in the same manner by replacing the heating member 12A with the heating member 12C and replacing the heating member 12B with the heating member 12D. Here, when there are a plurality of drying ovens 10 as in the present embodiment, the inlet and the outlet of the drying oven 10 refer to, for example, the inlet and the outlet of each drying oven 10. Therefore, as described above, in the present embodiment, the heating member 12A and the heating member 12C correspond to a heating member 12 at the inlet side of the drying oven 10, and the heating member 12B and the heating member 12D correspond to a heating member 12 at the outlet side of the drying oven 10.

Although the scale is changed in FIG. 3, the lengths of the heating member 12A and the heating member 12B in the transport direction A are 750 mm, and the lengths thereof in the width direction B are 350 mm. The electric power applied to the heating member 12A, which corresponds to the heat amount of the entire heating member 12A, is 3150 W, that is, the electric power per square centimeter, which corresponds to the heat amount generated per unit area, is 1.2 W. Further, the electric power applied to the heating member 12B, which corresponding to the heat amount of the entire heating member 12B is 2100 W, that is, the electric power per square centimeter, which corresponds to the heat amount generated per unit area, is 0.8 W. Note that the heat amount generated per unit area of the heating member 12 can be adjusted by, for example, changing the arrangement density of the nichrome wiring arranged on the metal plate.

In this way, in the printing device 1A of the present embodiment, the heating section 11 is adjusted such that the heating temperature at the inlet side of the drying oven 10 in the transport direction A is higher than the heating temperature at the outlet side of the drying oven 10 in the transport direction A. Therefore, the printing device 1A of the present embodiment can suppress insufficient heating of the print medium P in the vicinity of the inlet of the drying oven 10 and excessive heating of the print medium P in the vicinity of the outlet of the drying oven 10. That is, the printing device 1A of the present embodiment can suppress heating unevenness of the print medium P.

Note that the printing device 1A of the present embodiment includes a control section (not shown), which is electrically connected to the print head 3, the drying oven 10, and the like. The control section is provided with a storage section having a CPU, a ROM, a RAM, and the like, a motor driving section of various motors for transporting the print medium P or for scanning the print head 3, and the like. Each component such as the print head 3 and the drying oven 10 is driven by the control of the control section.

In the printing device 1A of the present embodiment, the first drying oven 10A includes the heating member 12A and the heating member 12B, which contact the opposite surface P2 of the print medium P to heat the opposite surface P2, and the second drying oven 10B includes the heating member 12C and the heating member 12D, which contact the opposite surface P2 of the print medium P to heat the opposite surface P2. Also, the first heating section 11A of the first drying oven 10A includes the heating member 12A as a first heating member and a heating member 12B as a second heating member, which is disposed downstream of the heating member 12A in the transport direction A. The second heating section 11B of the second drying oven 10B includes the heating member 12C as a first heating member and the heating member 12D as a second heating member, which is disposed downstream of the heating member 12C in the transport direction A. Also, as described above, the heat amount generated per unit area of the second heating member (the heating member 12B and the heating member 12D) is smaller than the heat amount generated per unit area of the first heating member (the heating member 12A and the heating member 12C). By setting the heat amount generated per unit area of the second heating member, which is disposed downstream in the transport direction A, to be smaller than the heat amount generated per unit area of the first heating member, which is disposed upstream in the transport direction A, it is possible to easily suppress heating unevenness of the print medium P using the heating members 12 that generate different heat amounts per unit area.

As described above, the printing device 1A of the present embodiment is provided with the second drying oven 10B having the second heating section 11B, which heats the print medium P downstream in the transport direction A from the first drying oven 10A. Similarly to the first heating section 11A, the second heating section 11B causes a higher heating temperature at the inlet side of the second drying oven 10B in the transport direction A than at the outlet side of the second drying oven 10B in the transport direction A. By providing a plurality of such drying ovens 10, it is possible to dry the print medium P in the second drying oven 10B in addition to the first drying oven 10A, and it is possible to effectively dry the ink which was ejected onto the print medium P. In addition, the second heating section 11B also causes the heating temperature at the inlet side of the second drying oven 10B in the transport direction A to be higher than the heating temperature at the outlet side of the second drying oven 10B in the transport direction A, and thus it is possible to suppress heating unevenness of the print medium P.

As described above, in the printing device 1A of the present embodiment, the second drying oven 10B includes the heating member 12, the second heating section 11B includes, as the heating member 12, the heating member 12C and the heating member 12D, which is disposed on the downstream side of the heating member 12C in the transport direction A, and the heat amount generated per unit area by the heating member 12D is smaller than the heat amount generated per unit area by the heating member 12C. For this reason, the printing device 1A of the present embodiment can suppress insufficient heating of the print medium P in the vicinity of the inlet of the second drying oven 10B and excessive heating of the print medium P in the vicinity of the outlet of the second drying oven 10B, and can suppress heating unevenness of the print medium P.

As described above, in the printing device 1A of the present embodiment, the heat amount generated per unit area of the heating member 12C and the heat amount generated per unit area of the heating member 12A are the same, but the heat amount generated per unit area of the heating member 12C may be smaller than the heat amount generated per unit area of the heating member 12A. By making the heat amount generated per unit area of the heating member 12C smaller than the heat amount generated per unit area of the heating member 12A, it is possible to suppress excessive heating of the print medium P. Such a configuration can be achieved, for example, by using the second heating section 11B used in the printing device 1H of the eighth embodiment (to be described later) instead of the second heating section 11B of the present embodiment.

As described above, in the printing device 1A of the present embodiment, the print head 3 can eject ink onto the image forming surface P1 while moving with respect to the print medium P, which is in a stopped state. The printing device 1A according to the present embodiment can perform the printing operation by repeating transport of the print medium P and ejection of ink from the print head 3 after the print medium P is stopped. In the printing device 1 having a configuration in which the printing operation is performed while the print medium P is intermittently transported, heating unevenness of the print medium P is particularly likely to occur. However, even in the printing device 1 having such a configuration, the printing device 1A of the present embodiment includes the drying oven 10 having the above-described configuration, and thus it is possible to suppress heating unevenness of the print medium P.

Second Embodiment

Figure 4:
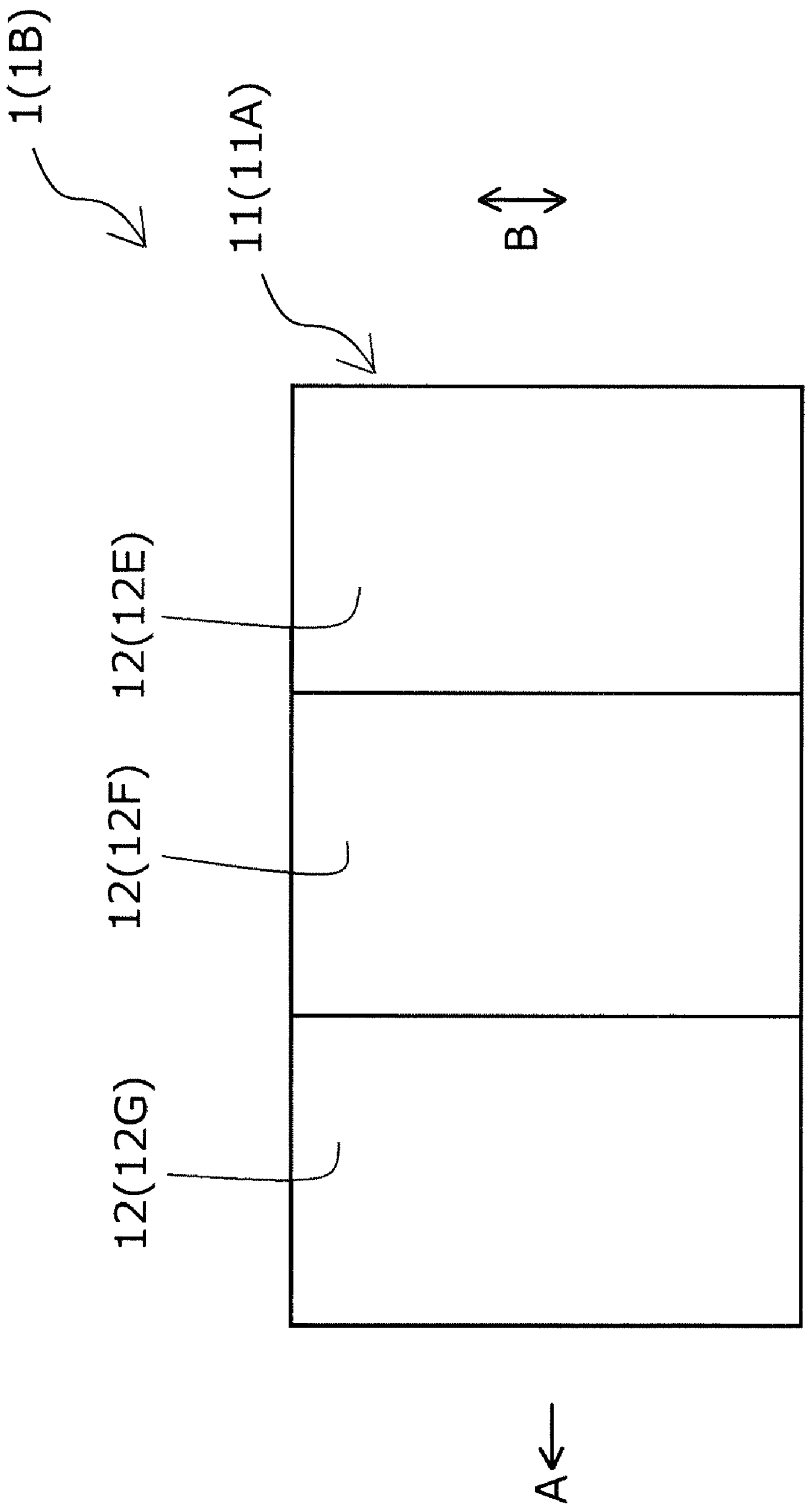
FIG. 4 is a schematic bottom view of a heating section of a printing device according to a second embodiment of the present disclosure.

Next, a printing device 1B according to a second embodiment will be described with reference to FIG. 4. FIG. 4 is a diagram corresponding to FIG. 3 of the printing device 1 in the first embodiment. In FIG. 4, components common to those of the first embodiment are denoted by the same reference numerals, and a detailed description thereof will be omitted. Here, the printing device 1B of the present embodiment has the same configuration as the printing device 1A of the first embodiment, except for the configuration of the heating section 11. For this reason, the printing device 1B of the present embodiment has the same features as those of the printing device 1A of first embodiment, except for the parts described below. Similarly to the printing device 1A of the first embodiment, the printing device 1B of the present embodiment includes, in addition to the first drying oven 10A, the second drying oven 10B that has the same configuration as the first drying oven 10A, with the exception that the arrangement of the second heating section 11B of the second drying oven 10B is different from the arrangement of the first heating section 11A of the first drying oven 10A, specifically, the arrangement of the heating section 11 is reversed by 180° when viewed from the side direction.

As described above, in the printing device 1A of first embodiment, as illustrated in FIGS. 2 and 3, the first heating section 11A includes two heating members 12, that is the heating member 12A and the heating member 12B, and similarly, the second heating section 11B includes two heating members 12, that is, the heating member 12C and the heating member 12D. On the other hand, as illustrated in FIG. 4, the first heating section 11A of the printing device 1B according to the present embodiment includes three heating members 12, that is, a heating member 12E, a heating member 12F, and a heating member 12G. Similarly to the printing device 1A of the first embodiment, the printing device 1B of the present embodiment includes a second drying oven 10B having the same configuration as the first drying oven 10A, except that the arrangement of the heating section 11 is different, and thus the second heating section 11B of the second drying oven 10B (not shown in FIG. 4) also includes three heating members 12.

Although the scale is changed in FIG. 4, the lengths of the heating member 12E, the heating member 12F, and the heating member 12G in the transport direction A are 500 mm, and the lengths thereof in the width direction B are 350 mm. The electric power applied to the heating member 12E corresponding to the heat amount of the entire heating member 12E is 2800 W, that is, the electric power per square centimeter corresponding to the heat amount generated per unit area is 1.6 W. Further, the electric power applied to the heating member 12F corresponding to the heat amount of the entire heating member 12F is 2100 W, that is, the electric power per square centimeter corresponding to the heat amount generated per unit area is 1.2 W. Further, the electric power applied to the heating member 12G corresponding to the heat amount of the entire heating member 12G is 1050 W, that is, the electric power per square centimeter corresponding to the heat amount generated per unit area is 0.6 W.

In the printing device 1B of the present embodiment illustrated in FIG. 4, the first heating section 11A includes the heating member 12G as a third heating member disposed downstream in the transport direction A from the heating member 12E as the first heating member and the heating member 12F as the second heating member. As described above, the heat amount generated per unit area of the heating member 12G is smaller than the heat amount generated per unit area of the heating member 12F. For this reason, by using the three heating members 12 in both the first drying oven 10A and in the second drying oven 10B, the printing device 1B of the present embodiment can suppress heating unevenness of the print medium P with higher accuracy than the printing device 1A of first embodiment.

Third Embodiment

Figure 5:
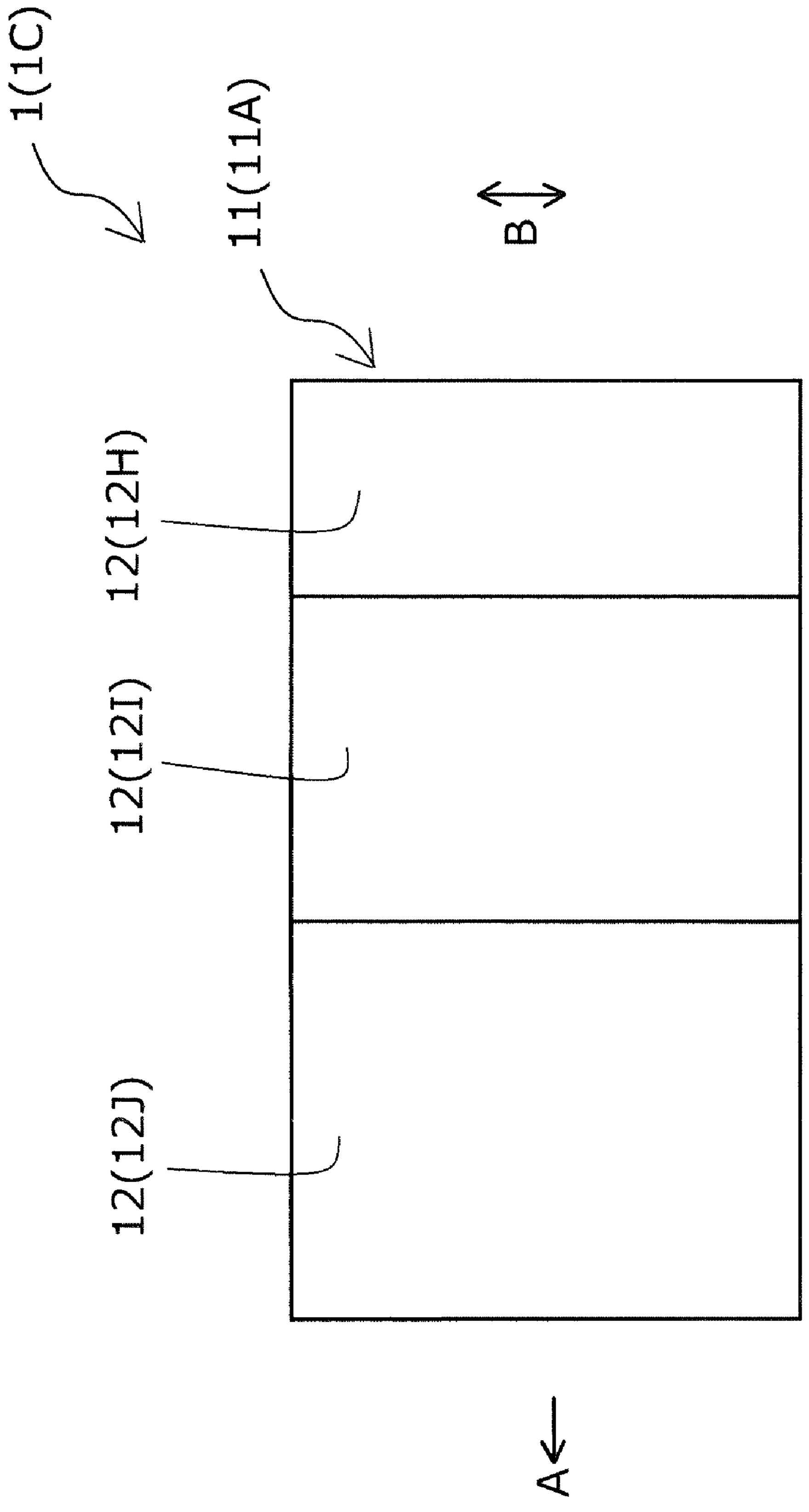
FIG. 5 is a schematic bottom view of a heating section of a printing device according to a third embodiment of the present disclosure.

Next, a printing device 1C according to a third embodiment will be described with reference to FIGS. 5 and 6. FIG. 5 is a diagram corresponding to FIG. 3 of the printing device 1 according to the first embodiment. In FIG. 5, components common to those of the first embodiment and the second embodiment are denoted by the same reference numerals, and detailed description thereof will be omitted. Here, the printing device 1C of the present embodiment has the same configuration as the printing device 1 of the first embodiment and the second embodiment, except for the configuration of the heating section 11. For this reason, the printing device 1C of the present embodiment has the same features as those of the printing device 1 of the first embodiment and the second embodiment, except for the parts described below. Similarly to the printing device 1A of the first embodiment, the printing device 1C of the present embodiment includes, in addition to the first drying oven 10A, the second drying oven 10B that has the same configuration as the first drying oven 10A, with the exception that the arrangement of the second heating section 11B of the second drying oven 10B is different from the arrangement of the first heating section 11A of the first drying oven 10A, specifically, the arrangement of the heating section 11 is reversed by 180° when viewed from the side direction.

As described above, as illustrated in FIG. 4, the printing device 1B of second embodiment has a configuration in which the heating member 12E as the first heating member, the heating member 12F as the second heating member, and the heating member 12G as the third heating member have the same size and generate different heat amounts per unit area. On the other hand, in the printing device 1C of the present embodiment, the first heating member, the second heating member, and the third heating member have different sizes, and the total heat amount generated by each of the heating members 12 is the same. The details are as follows.

Although the scale is changed in FIG. 5, the dimension of a heating member 12H in the transport direction A is 270 mm and the dimension thereof in the width direction B is 350 mm. A heating member 12I has a dimension of 410 mm in the transport direction A and a dimension of 350 mm in the width direction B. A heating member 12J has a dimension of 820 mm in the transport direction A and a dimension of 350 mm in the width direction B. The electric power applied to the heating member 12, which corresponds to the total heat amount generated by the heating member 12H, by the heating member 12I, and by the heating member 12J, is 1700 W. Therefore, the electric power per square centimeter corresponding to the heat amount generated per unit area of the heating member 12H is 1.8 W, the electric power per square centimeter corresponding to the heat amount generated per unit area of the heating member 12I is 1.2 W, and the electric power per square centimeter corresponding to the heat amount generated per unit area of the heating member 12J is 0.6 W.

Figure 6:
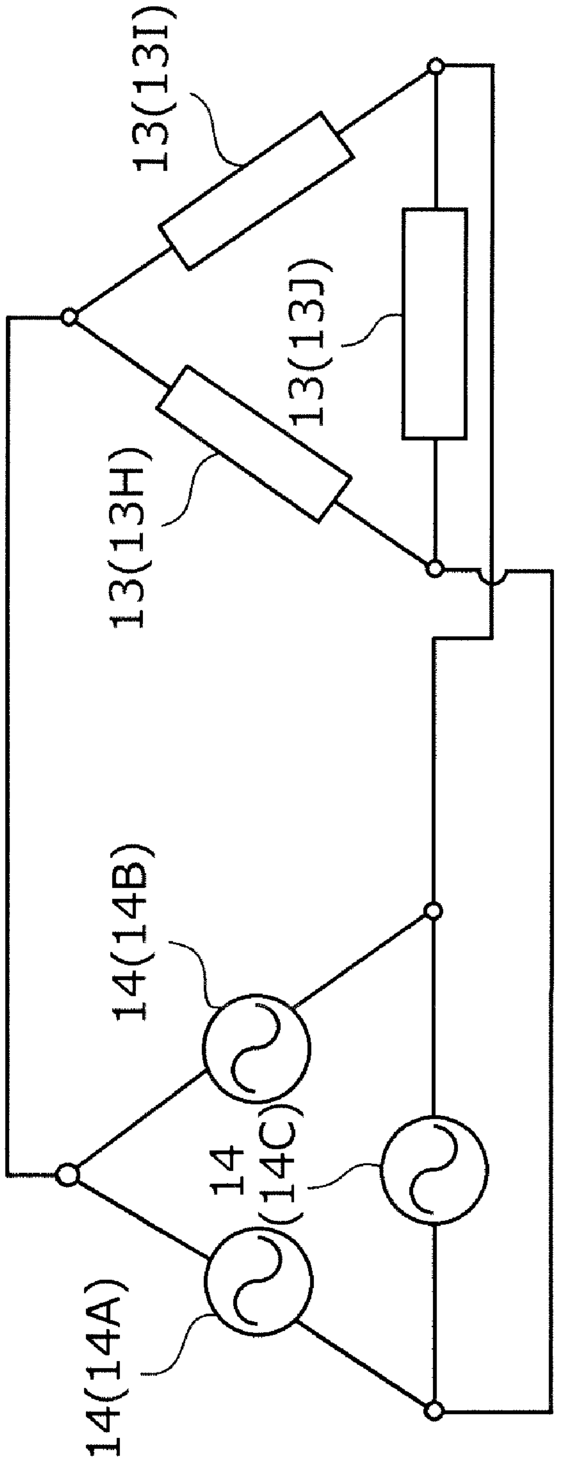
FIG. 6 is a schematic diagram showing connection between an electric power supply and a heating section of the printing device of FIG. 5.

Here, FIG. 6 shows an example of connection between an AC power source 14 and the heating member and its controller 13 in the printing device 1C of the present embodiment. As illustrated in FIG. 6, the printing device 1C of the present embodiment includes an AC power source 14A, an AC power source 14B, and an AC power source 14C as the AC power source 14. A heating member corresponding to the heating member 12H and its controller 13H, a heating member corresponding to the heating member 12I and its controller 13I, and a heating member corresponding to the heating member 12J and its controller 13J are provided as the heating member and its controller 13.

As described above, the printing device 1C according to the present embodiment includes the AC power source 14A, the AC power source 14B, and the AC power source 14C as electric power supplying sections that supply electric power to the heating member 12H as the first heating member, the heating member 12I as the second heating member disposed downstream from the first heating member in the transport direction A, and the heating member 12J as the third heating member disposed downstream from the second heating member in the transport direction A. The total heat amount of the heating member 12H, the total heat amount of the heating member 12I, and the total heat amount of the heating member 12J are equal to each other, and the AC power source 14A, the AC power source 14B, and the AC power source 14C as the electric power supplying section supply electric power to the heating member 12H, to the heating member 12I, and to the heating member 12J by a three phase delta connection. With such a configuration, it is possible to easily and appropriately supply electric power to the first heating member, to the second heating member, and to the third heating member.

Fourth Embodiment

Figure 7:
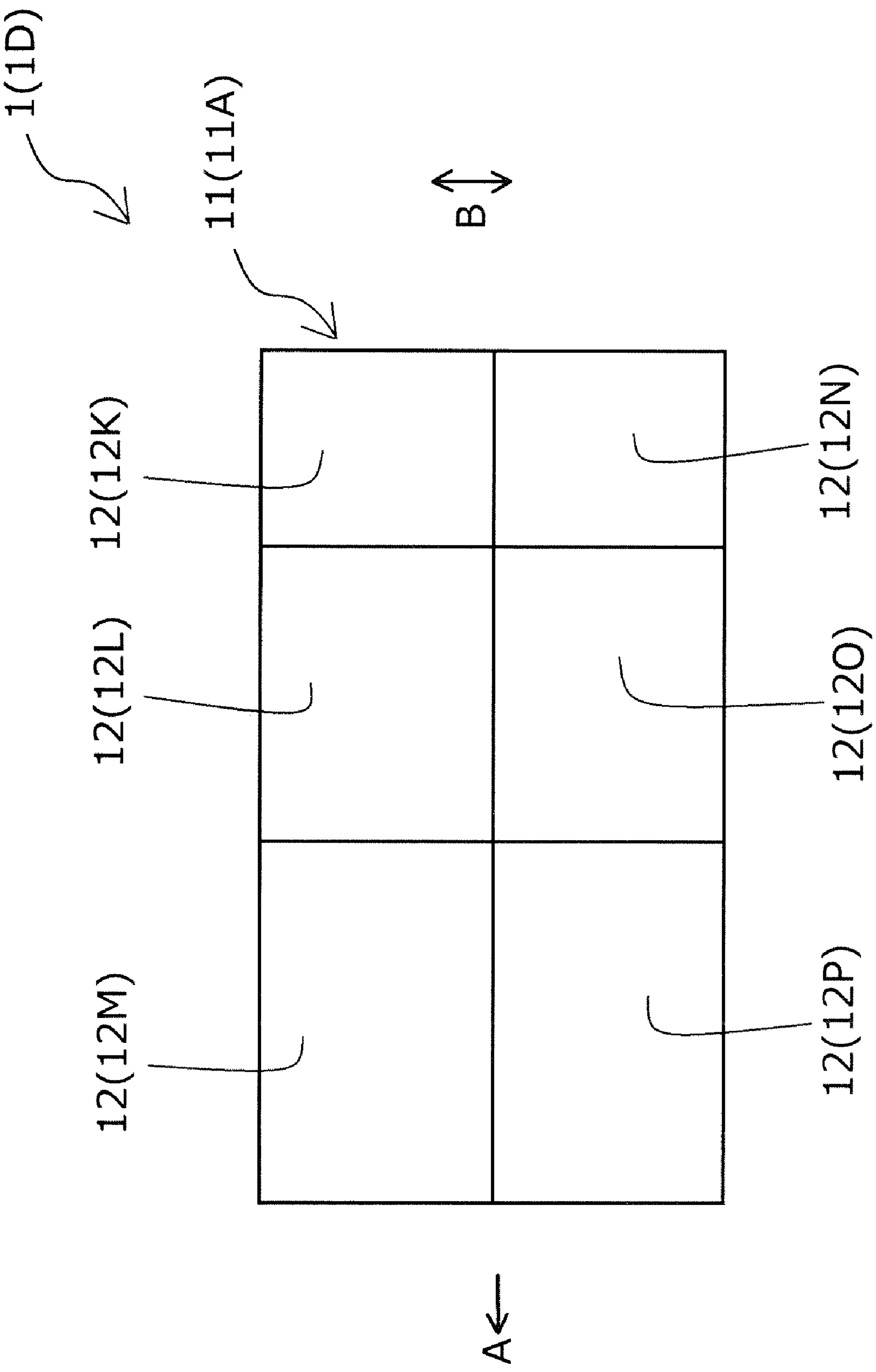
FIG. 7 is a schematic bottom view of a heating section of a printing device according to a fourth embodiment of the present disclosure.

Next, a printing device 1D according to a fourth embodiment will be described with reference to FIG. 7. FIG. 7 is a diagram corresponding to FIG. 3 of the printing device 1 according to the first embodiment. In FIG. 7, components common to those of the first embodiment to the third embodiment are denoted by the same reference numerals, and a detailed description thereof will be omitted. Here, the printing device 1D of the present embodiment has the same configuration as the printing device 1 of the first embodiment to the third embodiment, except for the configuration of the heating section 11. For this reason, the printing device 1D of the present embodiment has the same features as those of the printing device 1 of first embodiment to third embodiment, except for the parts described below. Similarly to the printing device 1A of the first embodiment, the printing device 1D of the present embodiment includes, in addition to the first drying oven 10A, the second drying oven 10B that has the same configuration as the first drying oven 10A, with the exception that the arrangement of the second heating section 11B of the second drying oven 10B is different from the arrangement of the first heating section 11A of the first drying oven 10A, specifically, the arrangement of the heating section 11 is reversed by 180° when viewed from the side direction.

As described above, in the printing device 1 of the first embodiment to the third embodiment, the heating member 12 was not divided in the width direction B. On the other hand, as shown in FIG. 7, the printing device 1D of the present embodiment includes, as the heating member 12, a heating member 12K and a heating member 12N arranged in the width direction B as a first heating member, a heating member 12L and a heating member 12O arranged in the width direction B as a second heating member, and a heating member 12M and a heating member 12P arranged in the width direction B as a third heating member. As described above, in the printing device 1D of the present embodiment, the heating section 11 is configured to enable drive divided in the width direction B.

In a configuration in which a print medium B that is narrow in the width direction B and a print medium P that is wide in the width direction B can be used, when the heating section 11 is driven across the entire width direction B in the transport path of the print medium P when the print medium P that is narrow in the width direction B is used, there is a concern that electric power may be wasted. However, the printing device 1D of the present embodiment is configured such that the heating section 11 can be driven divided in the width direction B. For this reason, the heating members 12 used when using the print medium P that is narrow in the width direction B can be limited to, for example, the heating member 12K, the heating member 12L, and the heating member 12M, and thus it is possible to suppress waste of electric power.

Although the scale is changed in FIG. 7, the dimensions of the heating member 12K and the heating member 12N in the transport direction A are 270 mm, and the dimensions thereof in the width direction B are 175 mm. The dimensions of the heating member 12L and the heating member 12O in the transport direction A are 410 mm, and the dimensions thereof in the width direction B are 175 mm. The dimensions of the heating member 12M and the heating member 12P in the transport direction A are 820 mm, and the dimensions thereof in the width direction B are 175 mm. The electric power applied to the heating member 12 corresponding to the total heat amount of each of the heating member 12K, the heating member 12L, and the heating member 12M and the total heat amount of each of the heating member 12N, the heating member 12O, and the heating member 12P is 850 W. Therefore, the electric power per square centimeter corresponding to the heat amount generated per unit area of the heating member 12K and the heating member 12N is 1.8 W, the electric power per square centimeter corresponding to the heat amount generated per unit area of the heating member 12L and the heating member 12O is 1.2 W, and the electric power per square centimeter corresponding to the heat amount generated per unit area of the heating member 12M and the heating member 12P is 0.6 W. As described above, in the present embodiment, the heating members 12 arranged in the width direction have the same size and the same heat amount. With such a configuration, it is possible to make it difficult for heating unevenness to occur even in the width direction with a simple configuration in a case where the print medium P having a wide width is used. However, it is not limited to such a configuration.

Fifth Embodiment

Figure 8:
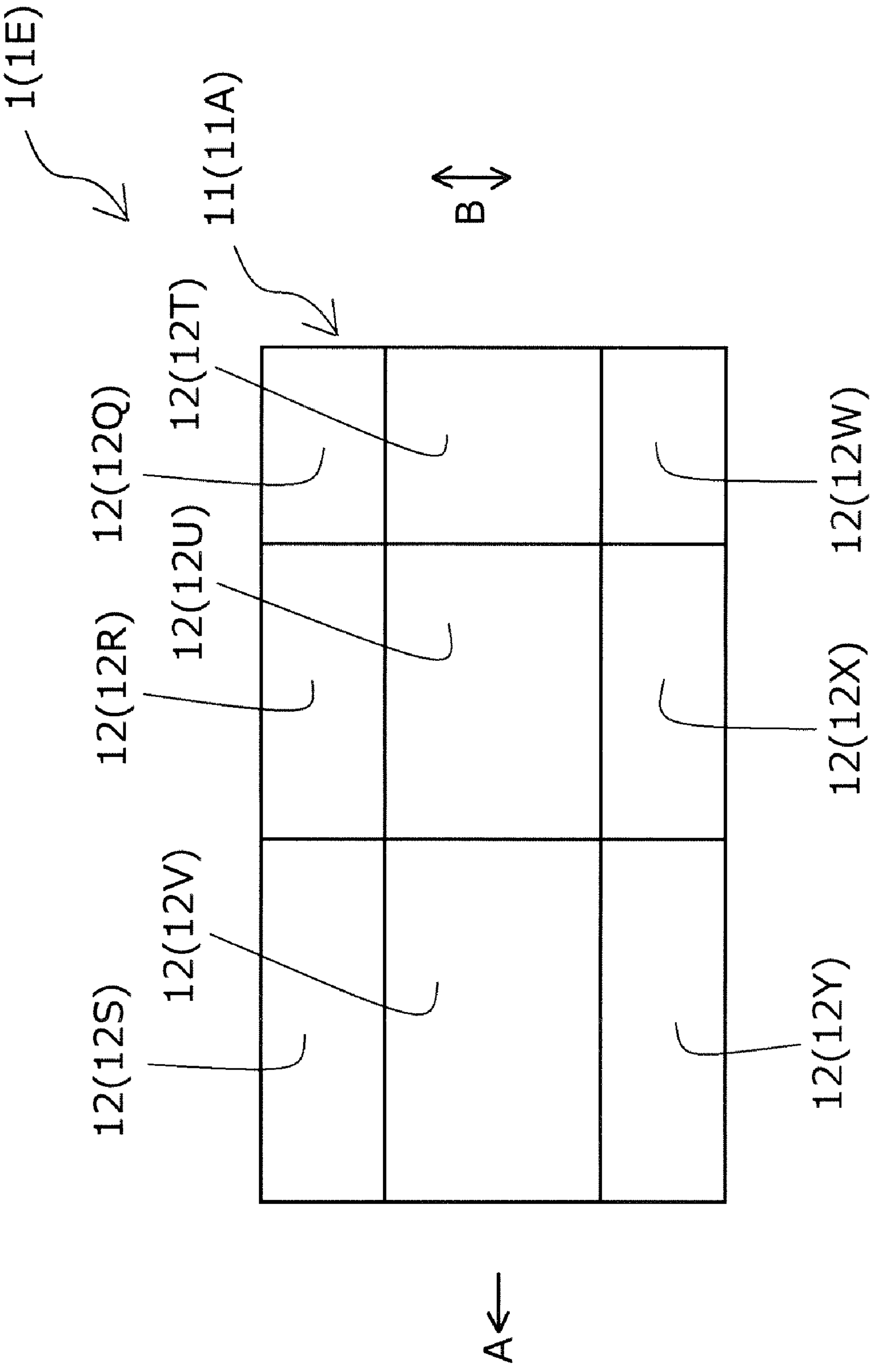
FIG. 8 is a schematic bottom view of a heating section of a printing device according to a fifth embodiment of the present disclosure.

Next, a printing device 1E according to a fifth embodiment will be described with reference to FIG. 8. FIG. 8 is a diagram corresponding to FIG. 3 of the printing device 1 according to the first embodiment. In FIG. 8, components common to those of the first embodiment to the fourth embodiment are denoted by the same reference numerals, and detailed description thereof will be omitted. Here, the printing device 1E of the present embodiment has the same configuration as the printing device 1 of the first embodiment to the fourth embodiment, except for the configuration of the heating section 11. For this reason, the printing device 1E of the present embodiment has the same features as those of the printing devices 1 of the first embodiment to the fourth embodiment, except for the parts described below. Similarly to the printing device 1A of the first embodiment, the printing device 1E of the present embodiment includes, in addition to the first drying oven 10A, the second drying oven 10B that has the same configuration as the first drying oven 10A, with the exception that the arrangement of the second heating section 11B of the second drying oven 10B is different from the arrangement of the first heating section 11A of the first drying oven 10A, specifically, the arrangement of the heating section 11 is reversed by 180° when viewed from the side direction.

The printing device 1D of fourth embodiment has a configuration in which, when the print medium P that is narrow in the width direction B is used, the print medium P can be transported toward the heating member 12K, the heating member 12L, and the heating member 12M side in the width direction B. For this reason, the heating members 12 to be used when the print medium P that is narrow in the width direction B is used can be limited to the heating member 12K, the heating member 12L, and the heating member 12M.

On the other hand, as shown in FIG. 8, the printing device 1E of the present embodiment includes, as the heating member 12, a heating member 12Q, a heating member 12T, and a heating member 12W as a first heating member arranged in the width direction B, a heating member 12R, a heating member 12U, and a heating member 12X as a second heating member arranged in the width direction B, and a heating member 12S, a heating member 12V, and a heating member 12Y as a third heating member arranged in the width direction B. In addition, when a print medium P that is narrow in the width direction B is used, the print medium P is transported with its center in the width direction B aligned with the center of the transport path in the width direction B. For this reason, in the printing device 1E of the present embodiment, when the print medium P that is narrow in the width direction B is used, the heating members 12 which are used can be limited to only the heating member 12T, the heating member 12U, and the heating member 12V.

Sixth Embodiment

Figure 9:
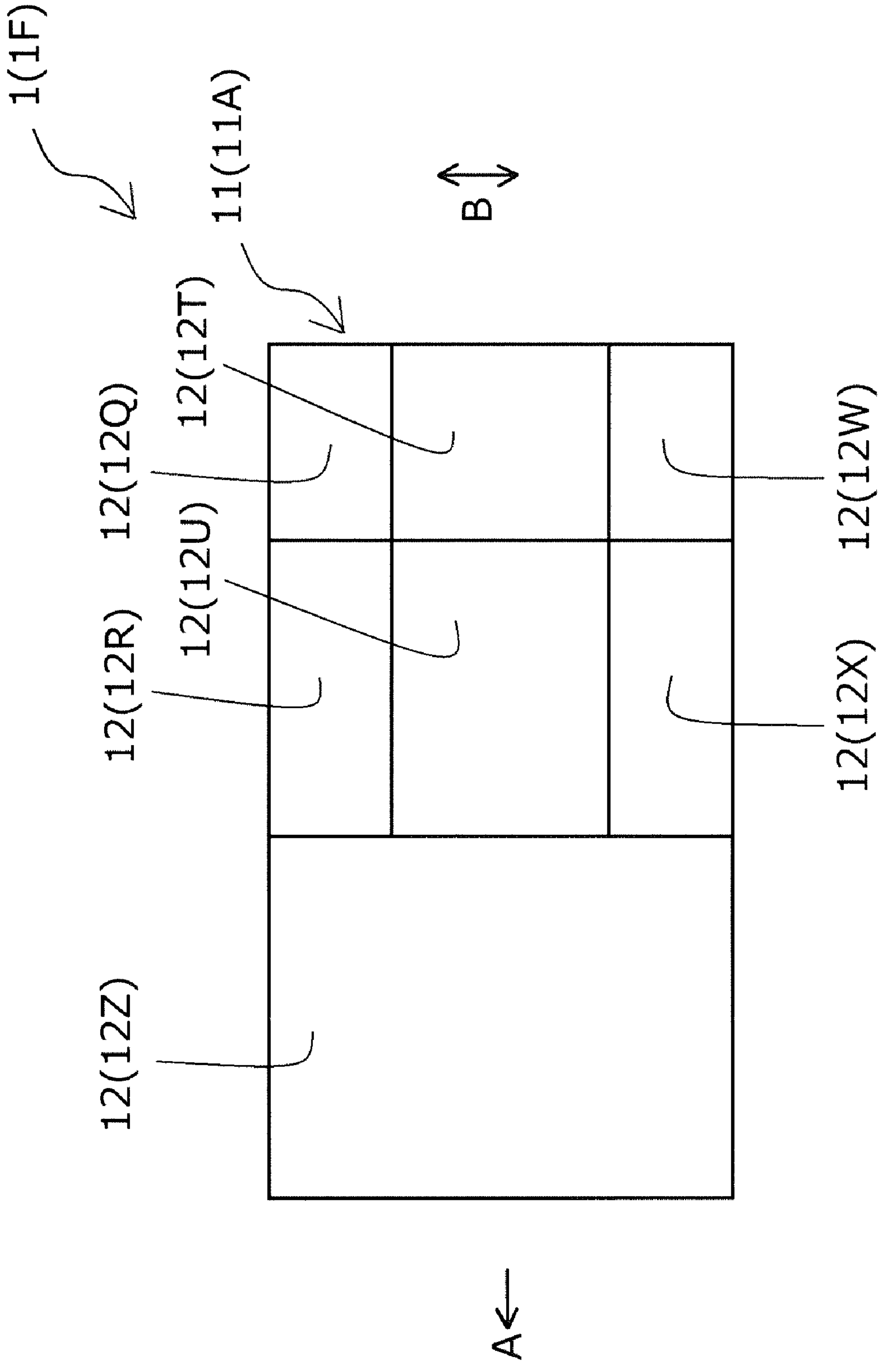
FIG. 9 is a schematic bottom view of a heating section of a printing device according to a sixth embodiment of the present disclosure.

Next, a printing device 1F according to a sixth embodiment will be described with reference to FIG. 9. FIG. 9 is a diagram corresponding to FIG. 3 in the printing device 1 according to the first embodiment. In FIG. 9, components common to those of the first embodiment to the fifth embodiment are denoted by the same reference numerals, and detailed description thereof will be omitted. Here, the printing device 1F of the present embodiment has the same configuration as the printing device 1 of the first embodiment to the fifth embodiment, except for the configuration of the heating section 11. For this reason, the printing device 1F of the present embodiment has the same features as those of the printing device 1 of the first embodiment to the fifth embodiment, except for the parts described below. Similarly to the printing device 1A of the first embodiment, the printing device 1F of the present embodiment includes, in addition to the first drying oven 10A, the second drying oven 10B that has the same configuration as the first drying oven 10A, with the exception that the arrangement of the second heating section 11B of the second drying oven 10B is different from the arrangement of the first heating section 11A of the first drying oven 10A, specifically, the arrangement of the heating section 11 is reversed by 180° when viewed from the side direction.

In the printing device 1 of the fourth embodiment and the fifth embodiment, the heating member 12 is divided in the width direction B in all of the first heating member at the inlet side of the drying oven 10, the second heating member at the center in the transport direction A, and the third heating member at the outlet side of the drying oven 10. On the other hand, in the printing device 1F of the present embodiment, as shown in FIG. 9, the heating member 12 is divided in the width direction B in the first heating member at the inlet side of the drying oven 10 and the second heating member at the center in the transport direction A similarly to the heating section 11 of the printing device 1 of the fifth embodiment, but the heating member 12Z, which is the third heating member at the outlet side of the drying oven 10, is not divided in the width direction B.

That is, in the printing device 1F of the present embodiment, the heating section 11 is configured to enable drive of the heating member 12 divided in the width direction B in the region at the inlet side of the drying oven 10 in the transport direction A, and is not configured to enable drive of the heating member 12 divided in the width direction B in the region at the outlet side of the drying oven 10 in the transport direction A. For example, when the print medium P having a narrow width is used, it is possible to effectively suppress heating unevenness of the print medium P while efficiently drying the ink ejected onto the print medium P while suppressing the electric power by controlling the heating member 12 with high accuracy, particularly in the region at the inlet side of the drying oven 10. In the printing device 1F of the present embodiment, the heating section 11 is configured to enable drive of the heating member 12 divided in the width direction B in the region at the inlet side of the drying oven 10 in the transport direction A, so even when, for example, a print medium P having a narrow width is used, ink that was ejected on the print medium P can be effectively dried while suppressing electric power and while heat unevenness of the print medium P can be effectively suppressed. In addition, since the printing device 1F of the present embodiment is not configured to enable drive of the heating member 12 divided in the width direction B in the region at the outlet side of the drying oven 10 in the transport direction A, the apparatus configuration and the driving control of the heating section 11 can be simplified.

Seventh Embodiment

Figure 10:
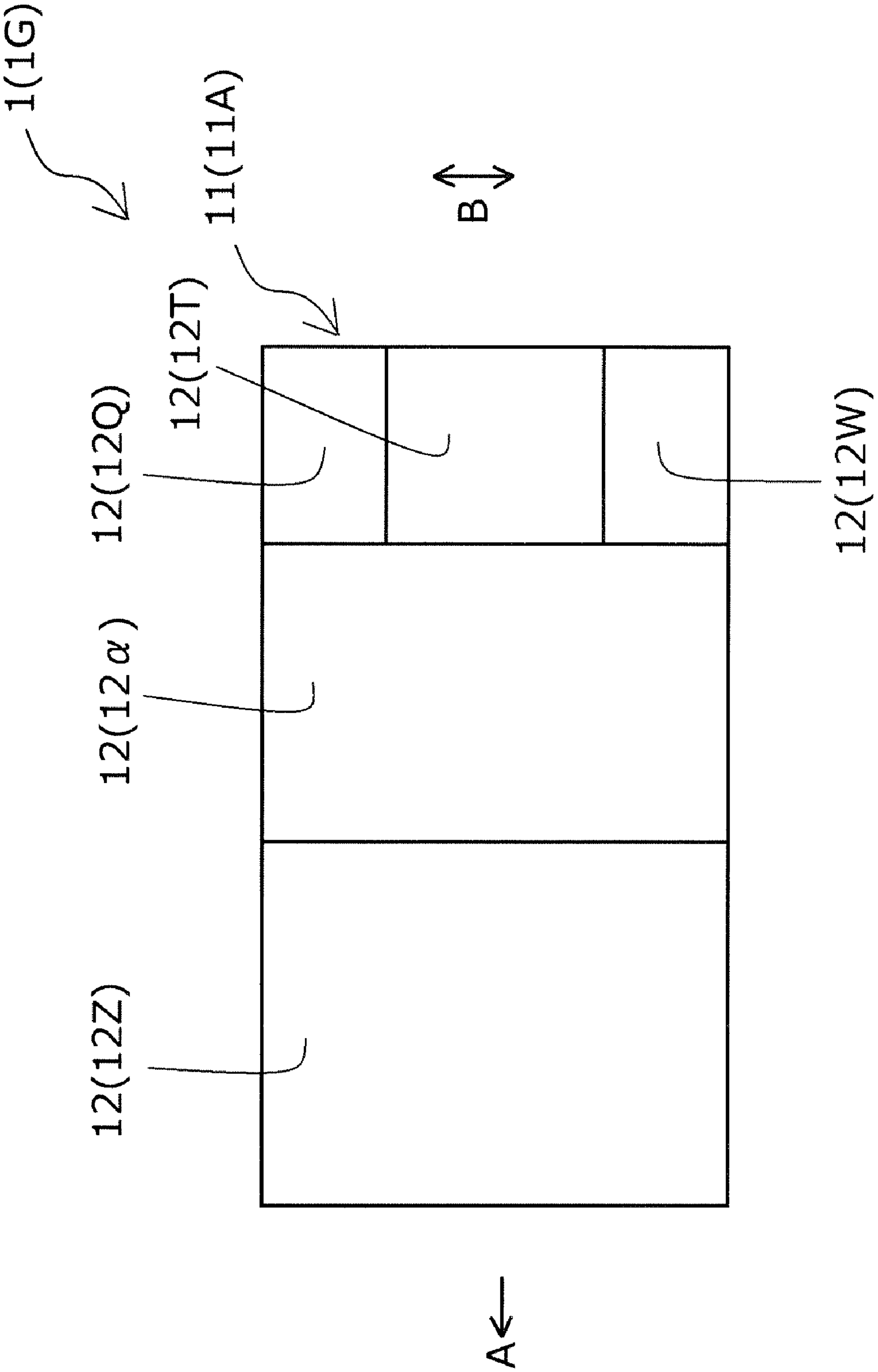
FIG. 10 is a schematic bottom view of a heating section of a printing device according to a seventh embodiment of the present disclosure.

Next, a printing device 1G according to a seventh embodiment will be described with reference to FIG. 10. FIG. 10 is a diagram corresponding to FIG. 3 of the printing device 1 according to the first embodiment. In FIG. 10, components common to those of the first embodiment to the sixth embodiment are denoted by the same reference numerals, and a detailed description thereof will be omitted. Here, the printing device 1G of the present embodiment has the same configuration as the printing device 1 of the first embodiment to the sixth embodiment, except for the configuration of the heating section 11. For this reason, the printing device 1G of the present embodiment has the same features as those of the printing device 1 of the first embodiment to the sixth embodiment, except for sections described below. Similarly to the printing device 1A of the first embodiment, the printing device 1G of the present embodiment includes, in addition to the first drying oven 10A, the second drying oven 10B that has the same configuration as the first drying oven 10A, with the exception that the arrangement of the second heating section 11B of the second drying oven 10B is different from the arrangement of the first heating section 11A of the first drying oven 10A, specifically, the arrangement of the heating section 11 is reversed by 180° when viewed from the side direction.

In the printing device 1F of sixth embodiment, the heating members 12 of the first heating member that is at the inlet side of the drying oven 10 and the second heating member that is at the center in the transport direction A, are divided in the width direction B, and the heating member 12Z that is the third heating member at the outlet side of the drying oven 10 is not divided in the width direction B. On the other hand, in the printing device 1G of the present embodiment, as shown in FIG. 10, only the heating member 12 that is the first heating member at the inlet side of the drying oven 10 is divided in the width direction B, and a heating member 12α that is the second heating member at the center in the transport direction A and a heating member 12Z that is the third heating member at the outlet side of the drying oven 10 are not divided in the width direction B. With such a configuration, the printing device 1G of the present embodiment can further simplify the apparatus configuration and the drive control of the heating section 11 compared to the printing device 1F of the sixth embodiment.

Eighth Embodiment

Figure 11:
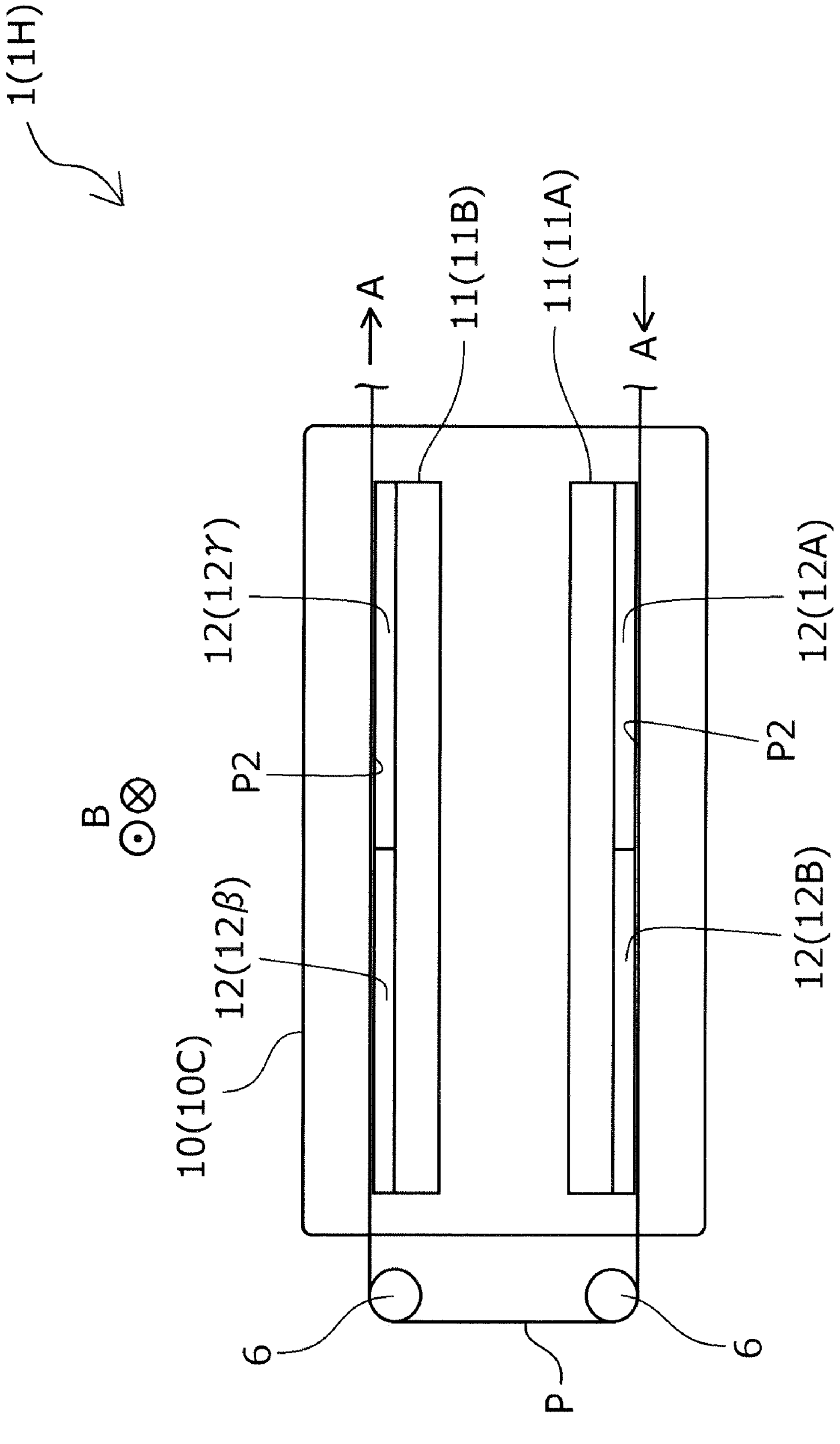
FIG. 11 is a schematic side view of a drying oven of a printing device according to an eighth embodiment of the present disclosure.

Next, a printing device 1H according to an eighth embodiment will be described with reference to FIG. 11. FIG. 11 is a diagram corresponding to FIG. 2 of the printing device 1 in the first embodiment. In FIG. 11, components common to those of the first embodiment to the seventh embodiment are denoted by the same reference numerals, and a detailed description thereof will be omitted. Here, the printing device 1H of the present embodiment has the same configuration as the printing device 1 of the first embodiment to the seventh embodiment, except for the configuration of the drying oven 10. For this reason, the printing device 1H of the present embodiment has the same features as those of the printing device 1 of the first embodiment to the seventh embodiment, except for sections described below.

The printing devices 1 of first embodiment to seventh embodiment include the first drying oven 10A and the second drying oven 10B as the drying oven 10. On the other hand, in the printing device 1H of the present embodiment, the drying oven 10 is only the single drying oven 10C shown in FIG. 11, and the drying oven 10C has a first heating section 11A, which is similar to that of the printing device 1A of first embodiment, and a second heating section 11B that has a heating member 12β and a heating member 12γ, which are heating members 12 different from those of the printing device LA. Note that in the present embodiment, the transport path of the print medium P exits outside the single drying oven 10C and then returns again, but the present disclosure is not limited to such a configuration, and a configuration may be provided in which the print medium P is sequentially heated by the heating member 12A, the heating member 12B, the heating member 12 β, and the heating member 12γ without moving outside the single drying oven 10. Here, the inlet and the outlet of the drying oven 10 also refer to an inlet and an outlet through which the print medium P enters again after exiting to the outside, for example, in a case as in the present embodiment where only a single drying oven 10 is provided but the transport path of the print medium P once goes to the outside. Therefore, as described above, in the present embodiment, the heating member 12A and the heating member 12β correspond to the heating member 12 at the inlet side of the drying oven 10, and the heating member 12B and the heating member 12γ correspond to the heating member 12 at the outlet side of the drying oven 10.

In detail, the printing device 1H of the present embodiment includes, at a position in the drying oven 10C downstream in the transport direction A from the first heating section 11A, a second heating section 11B in which the heating temperature at the inlet side of the drying oven 10C in the transport direction A is higher than the heating temperature at the outlet side of the drying oven 10C in the transport direction A. Here, the first heating section 11A includes, as the heating member 12, the heating member 12A and the heating member 12B, which is disposed downstream of the heating member 12A in the transport direction A, and the heat amount generated per unit area of the heating member 12B is smaller than the heat amount generated per unit area of the heating member 12A. The second heating section 11B includes, as the heating member 12, the heating member 12β and the heating member 12γ, which is disposed downstream of the heating member 12β in the transport direction A, and the heat amount generated per unit area of the heating member 12γ is smaller than the heat amount generated per unit area of the heating member 12β. By using the configuration including the plurality of heating sections 11, the printing device 1H according to the present embodiment can effectively dry ink that was ejected onto the print medium P. The heat amount generated per unit area of the heating member 12B is smaller than the heat amount per unit area of the heating member 12A, and the heat amount generated per unit area of the heating member 12γ is smaller than the heat amount generated per unit area of the heating member 12β, so the printing device 1H of the present embodiment can suppress heating unevenness of the print medium P.

In the printing device 1H of the present embodiment, the heat amount generated per unit area of the heating member 12β is smaller than the heat amount generated per unit area of the heating member 12B. For example, particularly in a case where the transport path is not such that the print medium P exits temporarily outside of the drying oven 10 or in a case such as in the present embodiment where the transport path is such that the print medium P exits temporarily outside of the drying oven 10 but the external transport path is short, by adopting such a configuration it is possible to effectively suppress heating unevenness of the print medium P while effectively drying ink that was ejected onto the print medium P.

Ninth Embodiment

Figure 12:
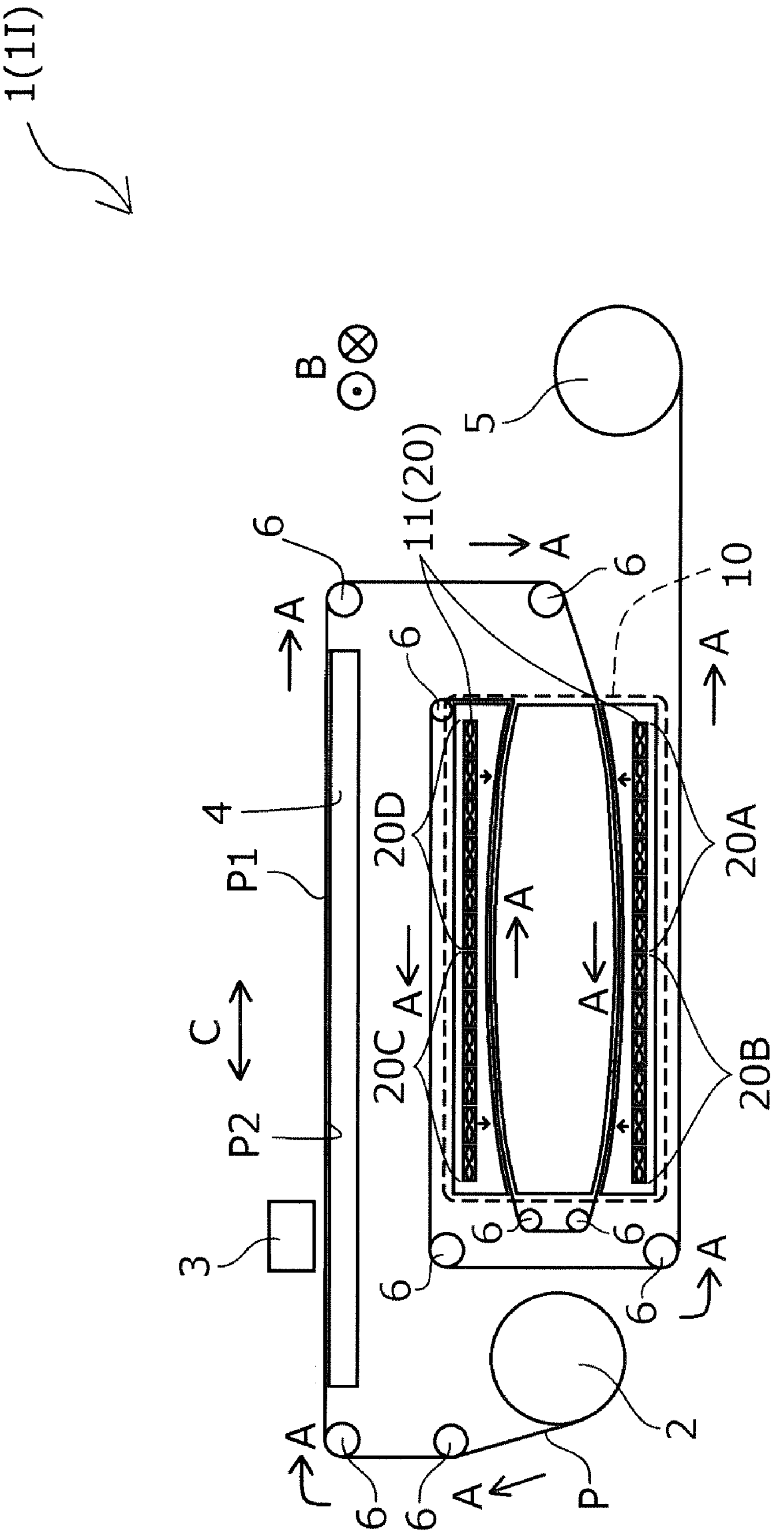
FIG. 12 is a schematic side view of a printing device according to a ninth embodiment of the present disclosure.

Next, a printing device 1I according to a ninth embodiment will be described with reference to FIG. 12. FIG. 12 is a diagram corresponding to FIG. 1 of the printing device 1 according to the first embodiment. In FIG. 12, components common to those of the first embodiment to the eighth embodiment are denoted by the same reference numerals, and a detailed description thereof will be omitted. Here, the printing device 1I of the present embodiment has the same configuration as the printing devices 1 of first embodiment to the eighth embodiment, except for the configuration of the heating section 11 inside the drying oven 10. For this reason, the printing device 1I of the present embodiment has the same features as those of the printing device 1 of the first embodiment to the eighth embodiment, except for sections described below.

As described above, the printing devices 1 of first embodiment to the eighth embodiment are configured to include, as the heating section 11, the heating member 12 that heats the opposite surface P2 by contacting the opposite surface P2 of the print medium P. On the other hand, as shown in FIG. 12, the printing device 1I of the present embodiment includes, as the heating section 11, a blower section 20 that blows a heated gas to the image forming surface P1.

In detail, the printing device 1I of the present embodiment includes, as the blower section 20, a first blower section 20A and a second blower section 20B, which is disposed downstream of the first blower section 20A in the transport direction A. Here, the first blower section 20A and the second blower section 20B have a plurality of fans. The temperature of the gas blown by the second blower section 20B is adjusted to be lower than the temperature of the gas blown by the first blower section 20A. Since the printing device 1I of the present embodiment has such a configuration, it is possible to use the blower section 20 to suppress heating unevenness of the print medium P while drying ink that was ejected onto the print medium P.

More specifically, the printing device 1I of the present embodiment includes, downstream from the second blower section 20B in the transport direction A, a third blower section 20C and a fourth blower section 20D, which is disposed downstream of the third blower section 20C in the transport direction A, and each of the third blower section 20C and the fourth blower section 20D includes a plurality of fans. The temperature of the gas blown by the fourth blower section 20D is adjusted to be lower than the temperature of the gas blown by the third blower section 20C. Since the printing device 1I of the present embodiment has such a configuration, it is possible to use the blower section 20 to suppress heating unevenness of the print medium P while particularly effectively drying ink that was ejected onto the print medium P.

The present disclosure is not limited to the above-described embodiments, and can be realized by various configurations without departing from the scope of the present disclosure. For example, the technical features in the embodiments corresponding to the technical features in the respective aspects described in the summary of the present disclosure can be appropriately replaced or combined in order to solve some or all of the above-described problems or in order to achieve some or all of the above-described effects. In addition, if a technical feature is not described as an essential feature in the present specification, the technical feature can be deleted as appropriate.

What is claimed is:

1. A printing device comprising:

a setting section for setting a roll-shaped print medium;

a winding section that winds up the print medium transported from the setting section;

a print head configured to form an image by ejecting ink onto an image forming surface of the transported print medium; and a drying oven that is disposed in a transport path of the print medium at a position downstream of the print head in a transport direction of the print medium and that is configured to dry ink ejected onto the print medium, wherein the drying oven includes a heating section configured to heat the print medium and the heating section is configured such that a heating temperature on an inlet side of the drying oven in the transport direction is higher than a heating temperature on an outlet side of the drying oven in the transport direction.

2. The printing device according to claim 1, wherein the drying oven includes a heating member that contacts an opposite surface, which is opposite to the image forming surface, and heats the opposite surface, the heating section includes, as the heating member, a first heating member and a second heating member, which is disposed downstream of the first heating member in the transport direction, and a heat amount generated per unit area of the second heating member is smaller than a heat amount generated per unit area of the first heating member.

3. The printing device according to claim 2, wherein the heating section includes a third heating member disposed downstream of the second heating member in the transport direction and a heat amount generated per unit area of the third heating member is smaller than a heat amount generated per unit area of the second heating member.

4. The printing device according to claim 3, further comprising an electric power supplying section configured to supply electric power to the first heating member, to the second heating member, and to the third heating member, wherein a total heat amount of the first heating member, a total heat amount of the second heating member, and a total heat amount of the third heating member are equal and the electric power supplying section supplies electric power to the first heating member, to the second heating member, and to the third heating member by a three phase delta connection.

5. The printing device according to claim 2, wherein assuming that the drying oven is a first drying oven and that the heating section is a first heating section, a second drying oven including a second heating section configured to heat the print medium is provided downstream of the first drying oven in the transport direction and the second heating section is configured such that a heating temperature on an inlet side of the second drying oven in the transport direction is higher than a heating temperature on an outlet side of the second drying oven in the transport direction.

6. The printing device according to claim 5, wherein the second drying oven includes the heating member, the second heating section includes, as the heating member, a fourth heating member and a fifth heating member, which is disposed downstream of the fourth heating member in the transport direction, and a heat amount generated per unit area of the fifth heating member is smaller than a heat amount generated per unit area of the fourth heating member.

7. The printing device according to claim 6, wherein a heat amount generated per unit area of the fourth heating member is smaller than a heat amount generated per unit area of the first heating member.

8. The printing device according to claim 2, wherein assuming that the heating section is a first heating section, a second heating section configured such that a heating temperature at an inlet side of the drying oven in the transport direction is higher than a heating temperature at an outlet side of the drying oven in the transport direction is provided at a position in the drying oven downstream in the transport direction from the first heating section, the second heating section includes, as the heating member, a fourth heating member and a fifth heating member, which is disposed downstream of the fourth heating member in the transport direction, and a heat amount generated per unit area of the fifth heating member is smaller than a heat amount generated per unit area of the fourth heating member.

9. The printing device according to claim 8, wherein a heat amount generated per unit area of the fourth heating member is smaller than a heat amount generated per unit area of the second heating member.

10. The printing device according to claim 1, wherein the drying oven includes, as the heating section, a blower section that blows heated gas to the image forming surface, the blower section includes a first blower section and a second blower section, which is disposed downstream of the first blower section in the transport direction, and a temperature of gas blown by the second blower section is lower than a temperature of gas blown by the first blower section.

11. The printing device according to claim 1, wherein the heating section is configured to enable drive divided in a width direction, which intersects the transport direction.

12. The printing device according to claim 11, wherein the heating section is configured to enable drive divided in the width direction in a region on an inlet side of the drying oven in the transport direction and is not configured to enable drive divided in the width direction in a region on an outlet side of the drying oven in the transport direction.

13. The printing device according to claim 1, wherein the print head is configured to eject ink onto the image forming surface while moving with respect to the print medium in a stopped state and a printing operation is executed by repeating transport of the print medium and ejection of ink from the print head after the print medium is stopped.

* * * * *